United States Patent [19]

Ekstrand

[11] Patent Number: 4,945,646
[45] Date of Patent: Aug. 7, 1990

[54] ARRANGEMENT IN A LUMINOUS DOT SIGHTING INSTRUMENT

[75] Inventor: John A. I. Ekstrand, Ocala, Fla.

[73] Assignee: Interaims Aktiebolag, Malmö, Sweden

[21] Appl. No.: 269,787

[22] PCT Filed: May 9, 1986

[86] PCT No.: PCT/SE86/00219

§ 371 Date: Nov. 9, 1988

§ 102(e) Date: Nov. 9, 1988

[87] PCT Pub. No.: WO87/07005

PCT Pub. Date: Nov. 19, 1987

[30] Foreign Application Priority Data

Nov. 15, 1984 [SE] Sweden .................. 84057249

[51] Int. Cl.[5] ............... G02B 27/36; G02B 23/10; G02B 27/34
[52] U.S. Cl. ................... 33/245; 33/246; 356/252
[58] Field of Search ............ 33/245, 233, 241, 246; 250/467.1; 356/247, 251, 252

[56] References Cited

U.S. PATENT DOCUMENTS

| | | | |
|---|---|---|---|
| 2,180,184 | 11/1939 | Weaver | 33/246 |
| 3,213,539 | 10/1965 | Burris | 33/246 |
| 3,222,987 | 12/1965 | Wrigglesworth | 33/246 |
| 3,297,389 | 1/1967 | Gibson | 33/245 |
| 3,340,614 | 9/1967 | Leatherwood | 33/246 |
| 3,431,652 | 3/1969 | Leatherwood | 33/246 |
| 3,826,012 | 7/1974 | Pachmayr | 33/246 |
| 3,902,251 | 9/1975 | Ross | 33/246 |
| 3,938,875 | 2/1976 | Ruder | 33/233 |
| 3,942,901 | 3/1976 | Ekstrand | 356/251 |
| 3,992,782 | 11/1976 | Rickert | 33/246 |
| 4,389,791 | 6/1983 | Ackerman | 33/246 |
| 4,402,605 | 9/1983 | Ekstrand | 356/252 |
| 4,561,204 | 12/1985 | Binion | 33/245 |

FOREIGN PATENT DOCUMENTS 508190 7/1971 Switzerland .

Primary Examiner—William A. Cuchlinski, Jr.
Assistant Examiner—Christopher W. Fulton

[57] ABSTRACT

The invention relates to an arrangement of a luminous dot sighting instrument (1) for use together with a telescopic attachment (2). The invention is characterized in that the optical system of the luminous dot sighting instrument, i.e. the portion (15) containing a light-emitting diode (29) directed against a semitransparent spherical mirror (24) and supplied with current from the electronic system, is suspended in and, against or under the action of a spring load (27), universally angularly adjustable in relation to one tubular part (17a) of a twin tube member (17), the other tubular part (17b) of which carries the electronic system (16) of said sighting instrument, said member being arranged for mounting the sighting instrument on a firearm. For adjusting a telescopic attachment (2), when such an attachment is mounted on the luminous dot sighting instrument (1), the telescopic attachment is connected with the luminous dot sighting instrument by means of a joint (4, 5; 4', 5') which acts as an articulatable joint but can be locked in adjusted position by means of locking means (6; 4', 32). After adjustment and detachment of the telescopic attachment, the joint (4, 5; 4', 5') makes it possible to reattach the telescopic attachment without need for subsequent adjustment as long as the adjustment of the luminous dot sighting instrument is unchanged.

11 Claims, 3 Drawing Sheets

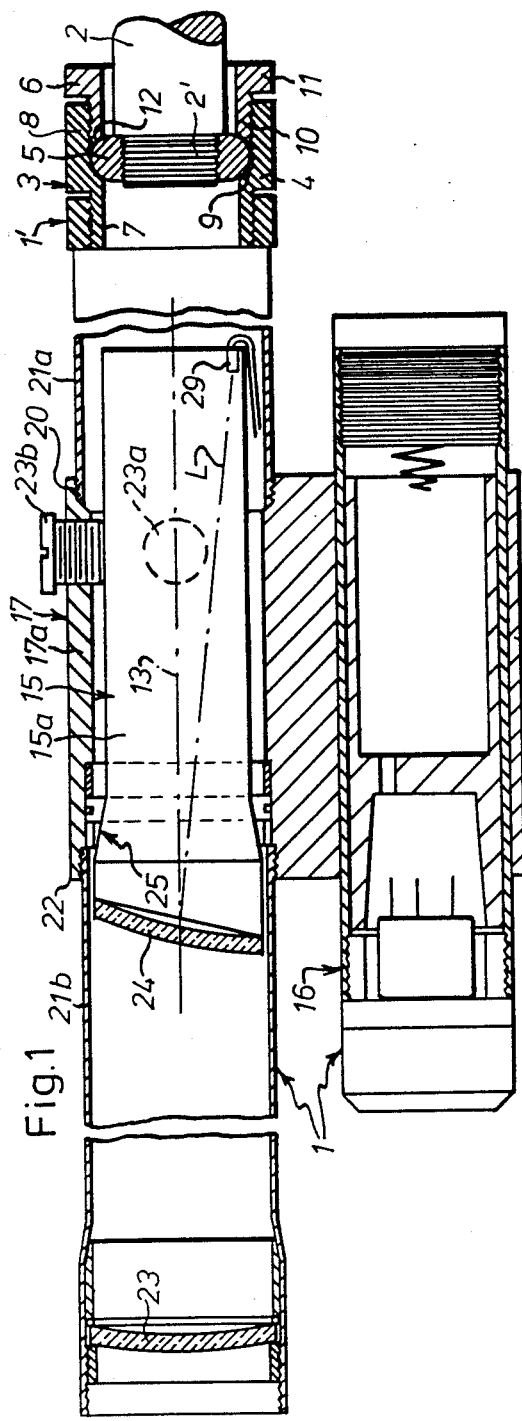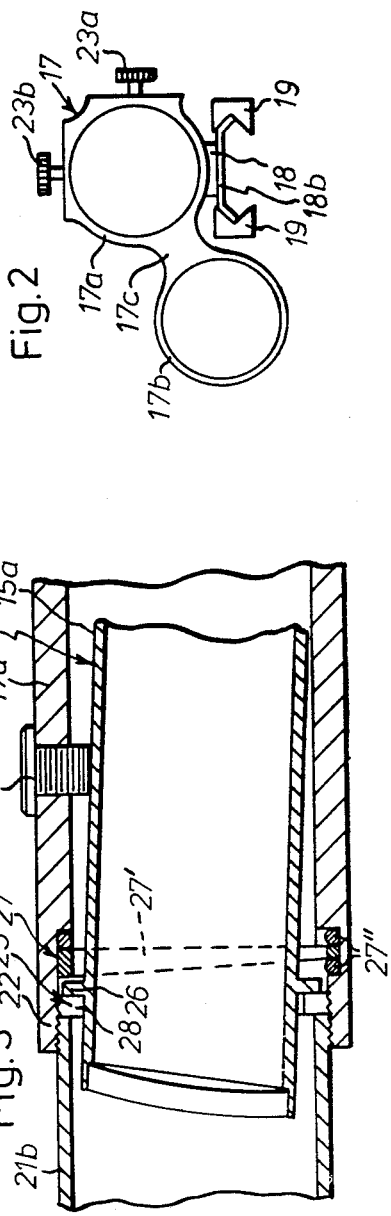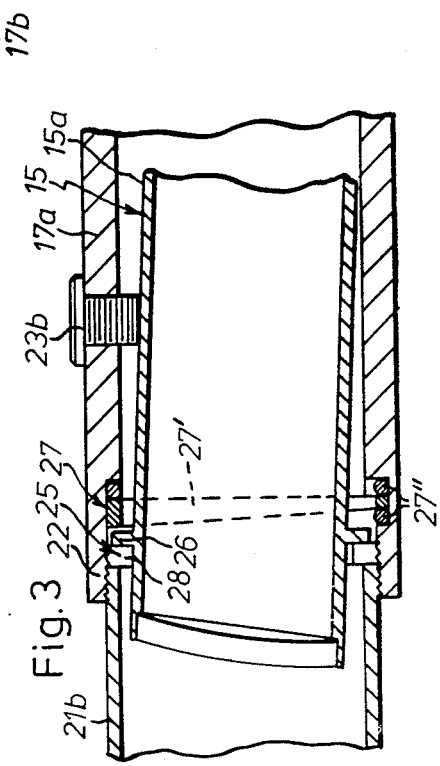

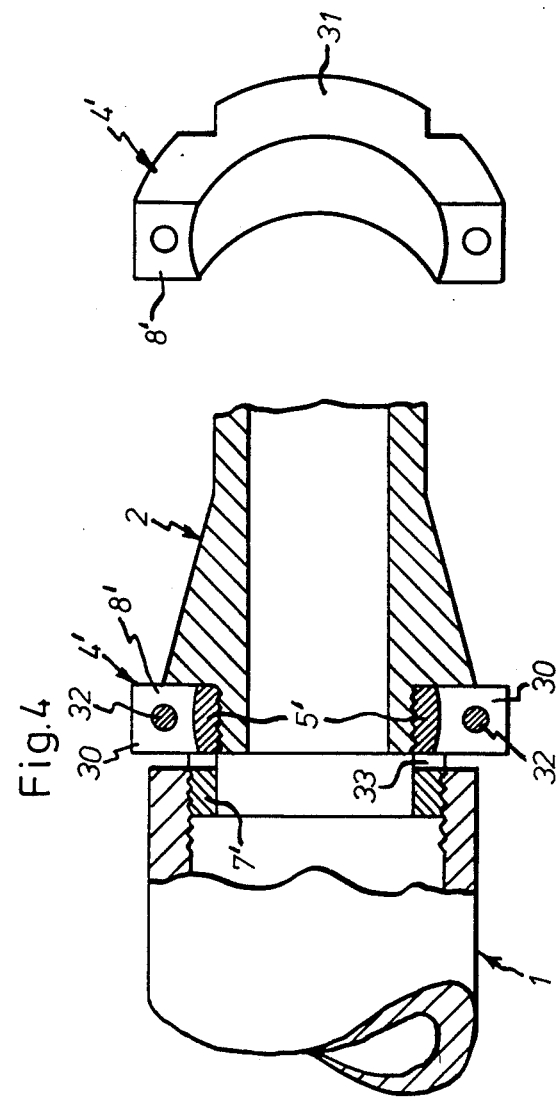

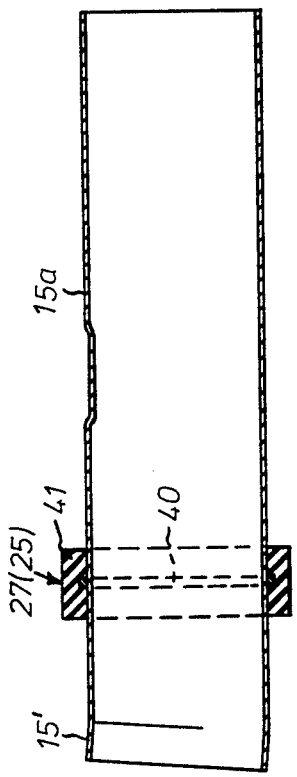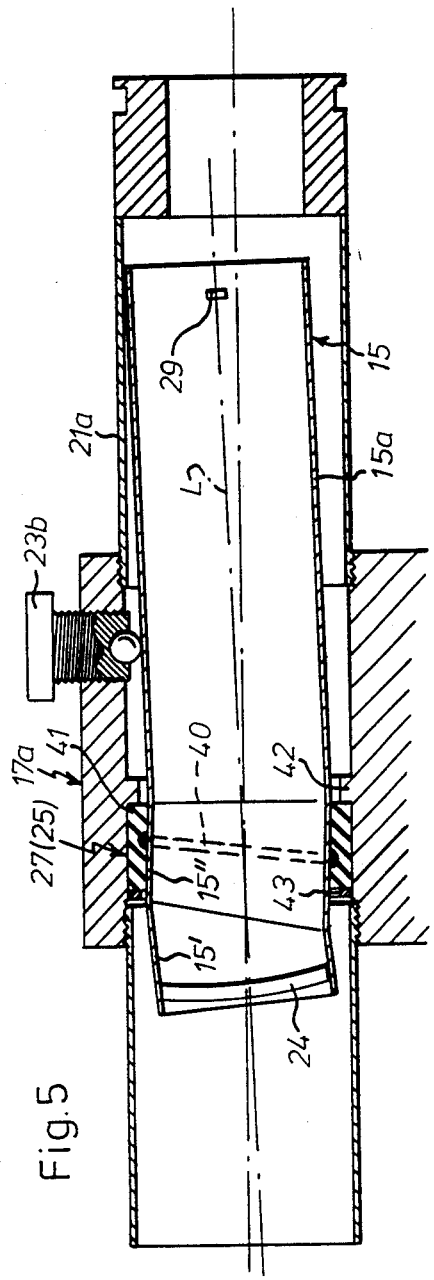

ARRANGEMENT IN A LUMINOUS DOT SIGHTING INSTRUMENT

The present invention relates to an arrangement of or in a luminous dot sighting instrument suitable for use in connection with a telescopic attachment. More particularly, the invention comprises means for vertical and horizontal adjustment of a luminous dot sighting instrument in relation to a support for connecting the luminous dot sighting instrument with a firearm, means for detachably connecting said luminous dot sighting instrument with said telescopic attachment, and a device for accurately presetting and centering the position of the luminous dot in relation to the telescopic attachment, without interfering with the centered position thereof when the telescopic attachment is removed from and again mounted on the luminous dot sighting instrument.

The use of telescopic attachments with luminous dot sighting instruments is of recent occurrence. The manner in which the telescopic attachment is connected with the luminous dot sighting instrument may vary, but since telescopic attachments sometimes are a hindrance to rapid aiming and shooting, or on certain occasions perhaps even may be unnecessary, the connection should permit simple mounting and removal of the telescopic attachment.

An objective common to both luminous dot sights and telescopic sights which are to be used separately as a sighting instrument and therefore are mounted directly on a firearm, is that the sight, after it has been detached from the firearm, should be reattachable thereto in such an exact position that the firearm need not be test-fired again. Also, these separately used sights should permit simple and exact vertical and horizontal adjustment during test-firing.

A closely related objective in a luminous dot sighting instrument with telescopic attachment is to make the attachment readily adjustable in relation to the luminous dot sighting instrument, such that the luminous dot, i.e. the aiming point, will be correctly centered with respect to the telescopic attachment.

In luminous dot sighting instruments where the vertical and horizontal adjustments are carried out by moving an inner tube containing an optical system with a light source and at least one semitransparent mirror, and preferably also the main lens of the lens system, in relation to an outer tube of the luminous dot sighting instrument, certain problems are encountered which are both functional and economical. The functional problem is that the viewing field is changed in response to the angle of adjustment of the inner tube in relation to the outer tube, and this may limit the maximum adjustment that can be attained. The economic disadvantage is that one may have to use a lens system having an unnecessarily large diameter in relation to the diameter of the inner tube to bring about the required angular adjustability in the outer tube. The economically most favourable solution, which is to grind the outer circumferential edge of the main lens to form the surface of a cylinder coaxial with an axis extending through the centre of the lens and at right angles to the lens plane, could not be used when the lens plane was positioned obliquely in relation to the longitudinal centre axis of the inner tube.

It is an object of the present invention to obviate these problems.

Admittedly, the problems discussed above are independent of one another in so far as the solution to one problem is applicable independently of the solution to another of these problems, but when the solutions are used concurrently, they are to some extent interrelated, for example, because the telescopic attachment makes the sighting instrument much longer.

To sum up, the invention serves to provide a luminous dot sighting instrument with vertical and horizontal adjustment means which permit a less problematic adjustment and are of a lighter and more economic, compact construction than conventional vertical and horizontal adjustment means for luminous dot sighting instruments and which also widen the possibilities of positioning the luminous dot sighting instrument optionally in relation to a firearm, and a device by means of which a telescopic attachment is readily connectible to the luminous dot sighting instrument and which facilitates centering the luminous dot by alignment of the telescopic attachment and, furthermore, solves the problem of reattaching a telescopic attachment removed from the luminous dot sighting instrument, without necessitating readjustment of the luminous dot centering.

A further object of the invention is to arrange a luminous dot sighting instrument in such a manner that it can be vertically and horizontally adjusted in a highly efficient and extremely simple manner in connection with test-firing of a firearm equipped with the luminous dot sighting instrument, and in particular to provide a device which permits vertical and horizontal adjustment with a minimum of angular deflection of a telescopic attachment mounted on the luminous dot sighting instrument.

These objects have not been achieved by the present invention.

BRIEF DESCRIPTION OF THE DRAWINGS

The invention will be described in more detail below, reference being had to the accompanying drawings, in which;

FIG. 1 is an axial section of an arrangement according to the invention for vertical and horizontal adjustment of a luminous dot sighting instrument on which is mounted a telescopic instrument and on which also a device for luminous dot centering and detachable interconnection of the sighting instrument and the attachment is shown;

FIG. 2 is an end view of a supporting device for connecting the sighting instrument to a firearm;

FIG. 3 is a longitudinal section, on a larger scale of the vertical and horizontal adjustment means;

FIG. 4 shows a modification of the connection in FIG. 1 between the luminous dot sighting instrument and the telescopic attachment;

FIG. 5 is an axial section of an embodiment in which the front end portion of the inner tube is angularly inclined in relation to the rear portion thereof, and the circumferential edge of the lens is perpendicular to the lens plane; and FIG. 6 illustrates the inner tube in a preferred embodiment offering the same advantages as the embodiment according to FIG. 6 but at smaller tube inclinations and larger viewing fields.

DESCRIPTION OF PREFERRED EMBODIMENTS

FIG. 1 gives a fragmentary and schematic view of the luminous dot sighting instrument 1 and the telescopic attachment 2 which are detachably interconnected by means of an adapter generally designated 3 and comprising, in the embodiment illustrated in FIG. 1, three parts, more particularly, an intermediate part 4, an adjustable nut 5 and a locking ring 6.

The intermediate part 4 is in the form of a sleeve, one end portion 7 of which, in the embodiment illustrated, has a smaller outer diameter than the opposite end portion 8 of the sleeve. The first-mentioned end portion 7 which has an external thread, is screwed into the rear end portion of the luminous dot sighting instrument 1, for example directly into the eye cup 1' of the instrument 1. To this end, the eye cup piece 1' is provided with an inner thread.

In the embodiment illustrated, the end portion 8 of the intermediate part 4, which faces away from the luminous dot sighting instrument 1, has a greater inner diameter and a greater outer diameter than the end portion 7 screwed into the eye cup 1', and has on its inner side, at the transition to said last-mentioned portion 7, a shoulder which comprises an annular, conical abutment surface 9. The locking ring 6 has a threaded end portion 10 and a fingerhold portion 11 which may be knurled, as may also be the outer side of the intermediate part, to ensure a firm grip.

The nut 5 which, as will appear from the following, forms an adjusting ring, is disposed between the abutment surface 9 on the inner side of the intermediate part 4 and the end surface 12 of the end portion of the locking ring 6 screwed into said intermediate part 4. This end surface 12 may have the same shape as the conical abutment surface 9, but these surfaces 9, 12 may also be spherical. The nut 5 has spherical surfaces facing the abutment 9 of the intermediate part and the adjacent end 12 of the locking ring, and the radial plane of symmetry of the nut/locking ring 6 is adjustable in relation to the longitudinal axis 13 of the luminous dot sighting instrument to permit angular adjustment of the telescopic attachment 2 which has a threaded end portion 2' matching the thread of the nut and is screwed into said nut.

The adjustment and centering arrangement described above resembles an adjustable ball-and-socket joint that can be locked in adjusted position.

It conical surfaces 9 and 12 are spherical, they must have at least essentially the same radius as the shperical surfaces of the nut 5 facing said surfaces. The nut 5 may have a continuously spherical locking surface, i.e., that part of the circumferential surface of the nut 5 which faces the inner circumferential surface of the intermediate part 4 in the region between the abutment surface 9 of the intermediate part and the end surface 12 of the locking ring 6 may be spherical, but this part of the circumferential surface of the nut 5 may, if desired also be cylindrical, and moreover, this may be advantageous because it makes it possible to extend the inner thread of the intermediate part right up to the abutment face 9, without risking that the nut 5 comes into contact with the inner thread of the intermediate part.

To adjust and center the sighting mark, i.e., the luminous dot of the sight 1, or—and this mode of expression is equally correct—to center the longitudinal axis of the telescopic attachment onto the luminous dot which is not absolutely bound to lie on the geometrical axis 13 of the sighting instrument 1, one first relieves the pressure of the locking ring 6 against the nut 5 by rotating the locking ring 6 through the requisite angle in the direction in which it is loosened, whereupon the desired adjustment of the telescopic attachment is carried out by hand, such that the luminous dot is seen to lie on the centre axis 13 of the telescopic attachment. After that, the locking ring is tightened against the nut 5, care being taken that the telescopic attachment is retained in the adjusted position thus determined. The adjustment can be carried out against the action of a suitable frictional resistance, set by means of the locking ring 6, for pivoting the nut 5 whose spherical outer side slides on the faces 9, 12. It will be still easier to retain the telescopic attachment 1 in the correct adjusted position when the locking ring 6 is applied and tightened, if the surfaces 9, 12, or either one of them, for example the end surface 12 of the locking ring, is spherical and has the same radius as the spherical circumferential surface of the nut 5. In the latter case, it is important that all spherical surfaces have the same radius and central point. Since, as a rule, machining of exact spherical surfaces is more expensive than machining of exact conical surfaces, it may be advantageous from the viewpoints of production and economy to make the surfaces 9, 12 conical.

After the locking ring 6 has been applied to the nut 5 with a force sufficient to lock the nut in position, and with the telescopic attachment correctly centered, the sighting instrument in its entirety will have the function of a telescopic sight, but with a sighting mark in the form of a luminous dot instead of cross wires. Whenever desired, however, the telescopic attachment can be easily and conveniently detached from the locked nut 5 and be reattached at any time. Because the nut 5 is still locked in the correctly centered position, the telescopic attachment will be in the correctly centered position after reattachment.

FIG. 4 shows a modification in which the locking nut 6 has been dispensed with and the intermediate part 4' has a different design. It still has the shape of a sleeve, and its front end portion 7' has the same design as in FIG. 1, but its rear end portion 8' is divided along a diametral plane, and the two mating semi-circular parts 30, 31 can be clamped together by means of a pair of screws 32. One part 30 is formed integral with the front sleeve portion 7', but the other part 31 can be detached completely from the intermediate part formed by the sleeve 4'. The inner side of the rear end portion 8' of the sleeve 4', i.e. the inner sides of the two parts 30 and 31, are concavo-spherical, the centre of curvature lying on the longitudinal axis of the sleeve 4'. The nut 5' has essentially the same design as in FIG. 1 and is positioned with its convexo-spherical outer side in engagement with the concavo-spherical inner side of the sleeve portion 8'. The telescopic attachment and the nut 5' which is screwed onto the threaded front end portion of the attachment can be pivoted substantially in the manner of a ball in the sleeve portion 8' due to its contact with the spherical inner circumferential surface of the latter and can be locked in any adjusted position by clamping together the parts 30, 31 by means of the screws 32, such that the spherical surfaces are firmly locked relative to one another by friction.

To avoid deformation of the externally threaded front end portion 7' of the intermediate part, i.e. the sleeve 4', and to prevent any change of its outer diameter when the two parts 30, 31 are clamped together, a recess 33 is formed, such as by a saw cut or in some other manner, in the front sleeve portion 7' adjacent the sleeve portion 8'. The recess 33 is formed such that, when the two parts 30, 31 are clamped together, the intermediate sleeve 4' presents a slit which penetrates into the sleeve wall to about half the diameter at the transition between the two sleeve portions 7', 8' and which separates the removable sleeve part 30 axially from the front sleeve portion 7'. In this manner, the slit prevents deformation forces from being transferred to the front sleeve portion 7' when the two parts 30, 31 are clamped together.

The normal arrangement for mounting prior art luminous dot sighting instruments on firearms comprises a tubular member which encompasses at least the optical parts of the luminous dot sighting instrument and is mounted on a foot provided with inclined flanges for securing the instrument to the firearm by means of a Weaver TM type locking means, in which case vertical and horizontal adjustment of the sighting instrument is effected by means of a rail mounted between the foot and the tubular section and fixed to the underside of the latter. This arrangement does not leave room for mounting the electronic system of the luminous dot sighting instrument in a position sufficiently low so as not to obstruct free vision laterally of the luminous dot sighting instrument proper. The luminous dot sighting instrument and its electronic system are both of a generally tubular form and the tubular electronic system being mounted horizontally alongside of the tubular sighting instrument. In an attempt at improving the direct vision, some manufacturers have suggested that the electronic system be mounted vertically above the sighting instrument proper so as not to deprive the marksman of free direct optical vision horizontally on both sides of the sighting instrument. However, this last-mentioned mounting obstructs free optical vision beyond the luminous dot sighting instrument at long range in the firing direction, which is extremely vexatious, for which reason it is usually preferred to mount the optical system in question alongside of the sighting instrument proper.

In cognizance of this problem and the problem caused by inadequate free space for vertical adjustment of a luminous dot sighting instrument mounted on a firearm, especially when the sighting instrument is elongated by a telescopic attachment, the present invention proposes an improved mounting and adjusting arrangement which is described below and illustrated in FIGS. 2 and 3.

As already mentioned, a detachable telescopic attachment 2 of which only the front end portion adjacent the eye cup 1' of the luminous dot sighting instrument is shown, is mounted on the luminous dot sighting instrument 1 by means of an arrangement of the type described above.

The optical system of the luminous dot sighting instrument, i.e. the "sighting instrument proper" which is designated 15 in FIG. 1, comprises a lens system having a mirror and a light source of known type connected to the electronic system 16 which also is previously known. Both systems are generally cylindrical or tubular and interconnected by means of a supporting device in the form of a twin tube member 17 (FIG. 2). To reduce the height of the sighting instrument, including the twin tube member 17, a foot 18 and means for vertical and horizontal angular adjustment in relation to a firearm, the present invention provides a device for vertical and horizontal angular adjustment which is operative between the optical section 15 of the luminous dot sighting instrument and that part 17a of the twin tube member 17 which encompasses the optical system 15, whereby angular adjustment is made possible, such that a line between the centre axes of the two tubular parts 17a, 17b and the vertical plane is reduced from a normal angle of 90° to, for example, 60°, as in the embodiment shown in FIG. 2. It should, however, be noted that this angle in some cases—depending upon the type of firearm—may be even smaller. On a sporting rifle, however, an angle of up to 60° is acceptable to give free vision laterally of the luminous dot sighting instrument.

By turing the twin tube member, such that its rear end (in FIG. 2) constitutes the front end, it can be mounted on firearms equipped with a loading mechanism for left-handed marksmen, and if the twin tube member is turned about the axis of tubular part 17a into such a position that the hole for the screw 23a will be facing downwardly towards the rail 19, the angle of 60° is changed to 30°. In view hereof, turnable twin tube members should have holes for adjusting screws in three sides, in which case the underside shown in FIG. 2 may have the same shape as the upper side. In addition, such a twin tube member can be turned about the axis of tubular part 17a such that the tube part 17b thereof will be inclined obliquely upwards. By completely dispensing with the lugs shown in FIG. 2 in which the holes for the adjusting screws 23a, 23b are formed, such that both halves of the twin tube member will obtain circularly cylindrical circumferential surfaces, except where they are united by the web 17c, the member can be adjusted to any desired angle merely by being turned relative to the foot 18 and the rail 18b. The twin tube member may be formed in advance with several holes for several different angular positions, or the holes can be formed for the desired angular position for each particular use.

As is well known, the vertical and horizontal angular adjustment may be effected by means operative between a tubular member, in this particular case the tubular part 17a of the twin tube member, and the optical system 15 of a sighting instrument. However, it should be noted that the arrangement described below is applicable also to an embodiment in which the sighting instrument is adjustable relative to an external part of a different embodiment than the tubular part 17a in FIG. 2.

In the embodiment according to FIG. 1, the rear end, i.e. the end which in FIG. 1 is the right-hand end of the tubular part 17a shown in FIG. 2, is connected at 20 via a screw thread with a tubular member 21a forming the rear part of the sighting instrument and supporting the so-called eye cup 1' into which the adapter 3 (the intermediate member 4 thereof) is screwed. The tubular member 21b is screwed with its rear end portion into the front end portion 22, provided with an inner thread, of the tubular part 17a and is closed within its front end portion by means of a lens or protective glass 23.

The tubular members 17a, 21a and 21b thus form together a composite but continuous outer tube in which a tube, or tubular housing, 15a accommodating the optical system 15 is suspended, such that it is movable for vertical and horizontal angular adjustment by means of two adjusting screws 23a, 23b engaging along respectively a horizontal and a vertical axis with the circumferential surface of the tube 15a at a distance from the tube front end which carries a parabolic lens 24 having a semi-transparent mirror coating. At its front end portion, the tube 15a is supported by means of a device 25 which (see FIGS. 1 and 3) comprises a ring or an annular flange 26 at or on the front end portion of the tube 15a and an elastic biasing device 27 comprising an elastic ring 27' mounted in a recess on the inner side of the tubular part 17a, and a ring 28 which is screwed into the end portion of the tubular part 17a and urges the flange 26 axially inwardly. In the embodiment illustrated, the ring 27' is wedge-shaped, i.e. it is defined by converging end planes, and it is mounted with its circumferential portion clamped between ring-shaped elastic elements 27" in an annular recess on the inner side of the tubular part 17a.

Pressure exerted by the ring or flange 26 upon the wedge-shaped ring 27' between the elastic ring-shaped elements 27" is transformed into an elastic force which will exert an obliquely directed force upon the tube 15a which tends to tilt it into engagement with the vertical and horizontal adjusting screws 23a, 23b. Thus, by rotating the screws, the optical system will be tilted to a corresponding degree. In FIG. 3, the vertical adjusting screw 23b has been screwed down as far as possible. When the vertical adjusting screw 23b is screwed outwardly, i.e. upwards with respect to FIG. 3, the tube 15a will follow the screw due to the action of the elastic biasing device 27. The ring 27' need not itself act as a spring. The elastic force can be supplied by the rings 27", but instead of these elements it is also possible to use one or more elastic blocks, such as rubber blocks, disposed on either one side or on both sides of the wedge-shaped ring 27'.

In conjunction with the elastic biasing device 27, the device 25 described above thus acts as a universally articulatable spring loaded suspension and as a means for maintaining the optical system 15 in an axially fixed position within the tubular part 17a, but the elastic arrangement permits any axial movement associated with angular adjustments of the optical system. It should be noted that the elastic biasing device 27 also biases the tube 15a in the horizontal plane towards the screw 23a, i.e. perpendicularly to the plane of the drawing. The decreasing axial thickness of the ring 27' in the downward direction with respect to FIG. 3 serves to impart freedom of movement to the flange 26 on the tube 15a. In the embodiment illustrated in FIG. 3, the elastic arrangement tends to tilt the tube 15a upwardly towards the screw 23b and laterally towards the screw 23a (FIG. 2). When the angular adjustment of the tube 15a, i.e. the optical system 15, is changed, the luminous dot incident upon the mirror coating of the lens 24 is displaced from the light-emitting diode 29 (see FIG. 1) which is supplied with current from the electronic system 16. It should be noted that the downwardly decreasing axial dimension of the ring 27' is shown exaggerated in FIG. 3, and that the possible vertical angular adjustment of the tube 15a actually need not be large. In practical use, the flange 26 therefore may be almost in surface contact with the ring 27' along an essential part of its circumference, and its movement during adjustment is a more or less pronounced rolling movement on the front end of the ring 27'.

After vertical and horizontal angular adjustment of the sighting instrument in connection with the test-firing of a firearm, it is not a matter of course that the luminous dot which seems to lie at infinity from the exit end of the sighting instrument, has its path of rays extending through the centre of the lens 23. Although an "aberration" of this kind does not affect the accuracy of fire, it can be compensated for, when use is made of the telescopic attachment, by an adjustment by means of the device 3–6, such that the luminous dot or the image thereof will still be centered on the geometrical longitudinal axis of the telescopic attachment and appears to the marksman to lie on the centre of the lens 23.

Thus, and adjustment by means of the above-mentioned adjusting means 23a, 23b is an inner adjustment in relation to the tubular parts 17a, 21a, 21b, in contrast to an outer adjustment which, in the majority of vertical and horizontal angular adjustment devices for luminous dot sighting instruments, is carried out by vertical and horizontal angular in relation to a firearm, i.e., by adjustment of the foot 18 and the rail 18b in FIG. 2 relative to the firearm. The foot of such conventional supports must have a much greater height than that of the foot 18b in order to make room for horizontal and vertical adjusting screws on the foot and for spring means between the rail and the foot as well as a power transmission device for converting into a vertical angular adjustment the horizontal movement of the adjusting screws, because in this case, the horizontal as well as the vertical adjusting screws must be oriented horizontally.

FIG. 3, however, illustrates a problem encountered in luminous dot sighting instruments provided with "inner adjustment", i.e. adjustment of the optical system 15 with its built-in light source relative to an outer tube, such as the tube formed by the tubular parts 17a, 21a, 21b. For example, the tube 15a cannot be inclined further than into engagement with the outer tube 17a, 21a, 21b at the rear or front end of the tube 15a, and the viewing field decreases in response to the angle of inclination. The lens 24 with its mirror coating must be inclined relative to the axis 13 (FIG. 1) because its plane must be facing the light source. As a result, the viewing field tends to decrease even more. A further disadvantage is that the inclination of the lens 24 within the tube 15a causes the cylindrical circumferential edge of the lens to form an angle deviating from 90° relative to the plane of inclination. Although this is of little importance to the proper functioning, its significance from the economic point of view is considerable because it is far more expensive to make a lens with a circumferential edge which is inclined to the lens plane than to make a lens whose circumferential edge coincides with the surface of a cylinder coaxial with an axis perpendicular to the lens plane and extending through the centre of the lens plane. The additional cost of such a lens, multiplied by tens of thousands of lenses, may entail a large expense.

FIG. 1 illustrates an attempt at compensating for the viewing field decrease due to the angular adjustment of the lens relative to the axis 13. To this end, the front end portion of the tube 15a is widened, and use is made of a corresponding larger lens, which increases the cost of both the tube 15a and the lens, and the circumferential lens edge will still be inclined to the lens plane, i.e. in relation to the vertical axis through the centre of the lens plane.

FIG. 5 illustrates a solution according to which the front end portion of the tube 15a is inclined in opposite directions, first upwardly at 15" and then in the opposite direction at 15' relative to the central longitudinal axis of the tube 15a. The angle of inclination of the outer end portion may be correlated only to the maximum vertical azimuthal adjustment upwards or downwards since, in general, the deflection range for side angle adjustment is smaller. Due to said inclination, use can be made without difficulty of a a lens 24 having a circumferential edge whose centre axis coincides with the perpendicular axis centrally through the lens plane. Furthermore, the viewing field is changed far less upon vertical adjustment of the sighting instrument, and use may be made of an inner tube having a larger outer diameter, i.e. the difference between the inner diameter of the outer tube 17a, 21a, 21b and the outer diameter of the inner tube 15a may be less than in the embodiment according to FIGS. 1 and 3 for the same adjustability in azimuth and with less reduction of the viewing field within the adjustment range.

It should be noted that the angle of the end portion of the tube 15a is exaggerated in FIG. 5.

FIG. 6 shows a more correct proportion of the magnitude of the angle relative to the length and diameter proportions of the tube 1. Here, the length of the angled portion approximately corresponds to what is necessary for mounting a lens 24 with a circumferential edge of the type shown in FIG. 5, i.e. a circumferential edge which is coaxial with the central axis perpendicular through the lens plane. The angling degree need not be large, for example, 2°-5° or, preferably 4°, as in FIG. 6, or somewhat less.

In the embodiment shown in FIGS. 5 and 6, the retaining and elastic biasing devices 25, 27 comprise a locking ring 40 mounted on the tube 15a and a ring 41 of elastic material disposed in the tubular part 17a, such that the locking ring engages the inner circumferential surface of the ring 41, for example in a performed groove, or in a groove formed as a result of the elasticity of the ring 41. The elastic ring is axially fixed between, for example and as shown, an abutment 42 on the inner side of the tubular section part 17a and a stop ring 43 which is screwed into the end portion of the tubular part 17a into engagement with the ring 41 which is arranged to exert said obliquely directed force.

As will be evident from the above, each of the arrangements described is adapted to solve a separate problem, and therefore each of them could be used separately. In collaboration, however, these arrangements provide a complete solution of the main problem which is to facilitate, in a simple manner, all desired adjustments within the requisite adjustment range, and the solution of the problem of mounting the sighting instrument on a firearm in such a manner that the marksman will have maximum unobstructed vision ahead on either side of the sighting instrument, and it will be readily appreciated that the invention, in addition to the technical improvements described, reduces the weight of the luminous dot sighting instrument and makes for more convenient adjustment. For example, the unit comprising the twin tube member, the supporting foot and the foot rail can be made essentially lower and lighter, by designing the horizontal and vertical angle adjustment as an inner adjustment, i.e., an adjustment of the sight 15 proper within the tubular part 17a. The adjusting screws 23a, 23b will nevertheless be in the same elevated and convenient position as the adjusting screws of conventional telescopic sights and they are not positioned more or less inaccessibly between the sight and a firearm on which the instrument is mounted, which is unavoidable in prior art sighting instruments with twin tubular supports for the electronic and optical systems.

I claim:

1. An arrangement in a luminous dot sighting instrument comprising:

a supporting device;

a tubular housing disposed in said supporting device, said housing containing a lens means with a semi-transparent mirror and a light source for producing a luminous sighting mark;

means comprising adjusting screws disposed between said tubular housing and said supporting device for adjustment of the vertical and horizontal angular position of said tubular housing in relation to said supporting device; and elastic biasing means acting between said supporting device and said tubular housing for providing angularly adjustable resilient support of said tubular housing in said supporting device and for urging said tubular housing against said adjusting screws, said elastic biasing means acting on said tubular housing at a position axially spaced from said adjusting screws and comprising an annular elastic element encompassed by said supporting device and encompassing said tubular housing about a region adjacent one end of said tubular housing, said elastic biasing means exerting force components on said tubular hosuing which produce an obliquely directed bias on said tubular housing which tends to tilt said tubular housing into engagement with said adjusting screws; position axially spaced from said adjusting screws and comprising an annular elastic element encompassed by said supporting device and encompassing said tubular housing about a region adjacent one end of said tubular housing, said elastic biasing means exerting force components on said tubular housing which produce an obliquely directed bias on said tubular housing which tends to tilt said tubular housing into engagement with said adjusting screws;

said annular elastic element being positioned between support members carried by said supporting device which exert an axially compressive force on said annular elastic element, and said tubular housing carries a circumferential ring which imparts an axial force component from said annular elastic element to said tubular housing.

2. The arrangement in a luminous dot sighting instrument according to claim 1, wherein:

said tubular housing comprises an end portion which is angled in relation to the remainder of the housing;

said annular elastic element encompasses and acts upon said end portion; and said lens means is mounted in said end portion in a position perpendicular to the axis of said end portion, said lens means having a substantially cylindrical circumferential surface defining an axis which coincides with the axis of said end portion and with the main axis of a beam of rays emanating from said light source and impinging on the center of said semi-transparent mirror.

3. The arrangement in a luminous dot sighting instrument according to claim 1 and further comprising:

a coupling device, separably carried on said supporting device, for detachable interconnection of a telescopic attachment to said sighting instrument, said coupling device comprising (1) an angularly adjustable nut provided with means for separably coupling to a telescopic attachment and (2) locking means for applying a frictional force to said angularly adjustable nut to hold an adjusted position of said adjustable nut.

4. The arrangement in a luminous dot sighting instrument according to claim 3, wherein said locking means comprises a locking ring.

5. The arrangement in a luminous dot sighting instrument as defined in claim 3, wherein said locking means comprises mating semi-circular clamping parts.

6. An arrangement in a luminous dot sighting instrument comprising:
   a supporting device;
   a tubular housing disposed in said supporting device, said housing containing a lens means with a semi-transparent mirror and a light source for producing a luminous sighting mark;
   means comprising adjusting screws disposed between said tubular housing and said supporting device for adjustment of the vertical and horizontal angular position of said tubular housing in relation to said supporting device; and
   elastic biasing means acting between said supporting device and said tubular housing for providing angularly adjustable resilient support of said tubular housing in said supporting device and for urging said tubular housing against said adjusting screws, said elastic biasing means acting on said tubular housing at a position axially spaced from said adjusting screws and comprising an annular elastic element encompassed by said supporting device and encompassing said tubular housing about a region adjacent one end of said tubular housing, said elastic biasing means exerting force components on said tubular housing which produce an obliquely directed bias on said tubular housing which tends to tilt said tubular housing into engagement with said adjusting screws;
   said annular elastic element being positioned between support members carried by said supporting device which exert an axially compressive force on said annular elastic element, and said tubular housing carries a circumferential ring which imparts an axial force component from said annular elastic element to said tubular housing.

7. The arrangement in a luminous dot sighting instrument according to claim 6, wherein:
   said tubular housing comprises an end portion which is angled in relation to the remainder of the housing;
   said annular elastic element encompasses and acts upon said end portion; and
   said lens means is mounted in said end portion in a position perpendicular to the axis of said end portion, said lens means having a substantially cylindrical circumferential surface defining an axis which coincides with the axis of said end portion and with the main axis of a beam of rays emanating from said light source and impinging on the center of said semi-transparent mirror.

8. The arrangement in a luminous dot sighting instrument according to claim 6, wherein said tubular housing carries an annular flange with a support face, and said annular elastic element presents an end face abutting said support face, said end face lying in a plane which is oblique to the axis of said annular elastic element.

9. The arrangement in a luminous dot sighting instrument according to claim 6, and further comprising:
   a coupling device, separably carried on said supporting device, for detachable interconnection of a telescopic attachment to said sighting instrument, said coupling device comprising (1) an angularly adjustable nut provided with means for separably coupling to a telescopic attachment and (2) locking means for applying a frictional force to said angularly adjustable nut to hold on adjusted position of said adjustable nut.

10. The arrangement in a lumionus dot sighting instrument according to claim 9, wherein said locking means comprises a locking ring.

11. The arrangement in a luminous dot sighting instrument as defined in claim 9, wherein said locking means comprising mating semi-circular clamping parts.

* * * * *